US006926024B2

United States Patent
McEnerney

(10) Patent No.: US 6,926,024 B2
(45) Date of Patent: Aug. 9, 2005

(54) UTILITY VALVE BOX LOCKOUT DEVICE

(75) Inventor: Michael J. McEnerney, College Point, NY (US)

(73) Assignee: KeySpan Corporation, Hicksville, NY (US)

( * ) Notice: Subject to any disclaimer, the term of this patent is extended or adjusted under 35 U.S.C. 154(b) by 33 days.

(21) Appl. No.: 10/438,833

(22) Filed: May 16, 2003

(65) Prior Publication Data

US 2004/0226610 A1 Nov. 18, 2004

(51) Int. Cl.[7] ............................................. F16K 35/06
(52) U.S. Cl. ..................... 137/15.08; 137/382; 137/383
(58) Field of Search ........................... 137/15.01, 15.08, 137/364, 377, 382, 383, 1

(56) References Cited

U.S. PATENT DOCUMENTS

| 950,270 | A | | 2/1910 | Andrews |
|---|---|---|---|---|
| 1,349,610 | A | | 8/1920 | Gibney |
| 2,176,399 | A | | 10/1939 | Garrett |
| 2,335,899 | A | | 12/1943 | Arvintz |
| 3,220,433 | A | | 11/1965 | Steil |
| 3,797,286 | A | | 3/1974 | Saporito |
| 4,513,773 | A | | 4/1985 | Hardiman, Jr. |
| 5,234,029 | A | | 8/1993 | Thomas et al. |
| 5,803,124 | A | | 9/1998 | Newton et al. |
| 5,871,030 | A | * | 2/1999 | Agbay ........................ 137/382 |
| 6,009,897 | A | | 1/2000 | Hill et al. |
| 6,036,401 | A | | 3/2000 | Morina et al. |
| 6,131,604 | A | | 10/2000 | Harriss |

* cited by examiner

Primary Examiner—Kevin Lee
(74) Attorney, Agent, or Firm—Dickstein Shapiro Morin & Oshinsky LLP

(57) ABSTRACT

A lockout device to secure access to a pipeline valve through a utility valve box having an inwardly directed ring is described. The lockout device includes a tube with a shackle, a plate with an opening, and a lock. As installed, the tube fits within an interior space of the utility valve box. The lock locks the plate and tube together. The width of the plate is greater than the inner diameter of the ring.

17 Claims, 4 Drawing Sheets

PRIOR ART

UTILITY VALVE BOX LOCKOUT DEVICE

FIELD OF THE INVENTION

The invention generally relates to utility valve boxes, and more particularly to a device for enhancing the security of utility valve boxes that include an inwardly directed ring.

BACKGROUND

It is customary in many parts of the world to lay and bury pipes, such as water, gas and sewer pipelines, underground in the formation of, respectively, water, gas, and sewer systems. These underground pipelines sometimes require periodic isolation from the system, and hence are generally equipped with isolation valves. Utility valve boxes are installed in conjunction with the isolation valves to allow access to the valves. Examples of known valve boxes include U.S. Pat. Nos. 6,036,401 and 5,803,125.

There are currently a myriad of different designs of utility valve boxes. With reference to FIGS. 1 and 2, one utility valve box 10 is illustrated including a body member 11. The body member 11 surrounds a defined interior space 14. The body member 11 has an internal surface 12 extending the length of the body member 11. An inwardly directed lip or ring 16 extends into the interior space 14 from the internal surface 12. The body member 11 is bounded at one end by a covering 13 and is open at an opposing end 15. The opposing end 15 is adjacent to a valve 52 of a pipeline 50. Generally, access to the valve 52 is gained by removing the covering 13 and extending a tool through the interior space 14.

It is generally desired, however, to restrict the access to isolation valves to only those personnel authorized to perform functions in regard to those valves. Thus, it is desired that the utility valve boxes be secured to prevent unauthorized access. Several conventional lockout systems are known, such as, for example, U.S. Pat. Nos. 6,131,604 and 5,234,029. A disadvantage of the known lockout systems is that none of them is adapted to restrict access to utility valve boxes having an inwardly directed ring, such as the valve box 10.

SUMMARY

The invention provides a utility valve box that includes a body member having an interior space and an inwardly projecting ring in the interior space. The ring has a first diameter. The utility valve box further includes a locking device having a second diameter greater than the first diameter to suppress removal of said locking device from said body member.

The invention also provides an underground pipeline system that includes one or more underground pipelines, at least one of which having at least one valve, and a utility valve box configured to allow access from the surface to the at least one valve. The utility valve box includes a body member having a ring extending inwardly into an interior space. The ring has a first diameter. The utility valve box further includes a locking device having a second diameter greater than the first diameter to suppress access to the at least one valve.

The invention further provides a method for securing access to an underground valve by way of a utility valve box having an interior space into which an inwardly directed ring having a first diameter extends. The method includes providing a locking device comprising a tube with a shackle, a plate with an opening, and a lock, installing the tube within the interior space, positioning the plate on a first end of the tube with the shackle extending through an opening in the plate, and locking the tube to the plate with the lock. The plate has a second diameter which is no less than the first diameter of the ring.

These and other advantages and features of the invention will be more readily understood from the following detailed description of the invention that is provided in connection with the accompanying drawings.

DETAILED DESCRIPTION OF PREFERRED EMBODIMENTS

Figure 1:
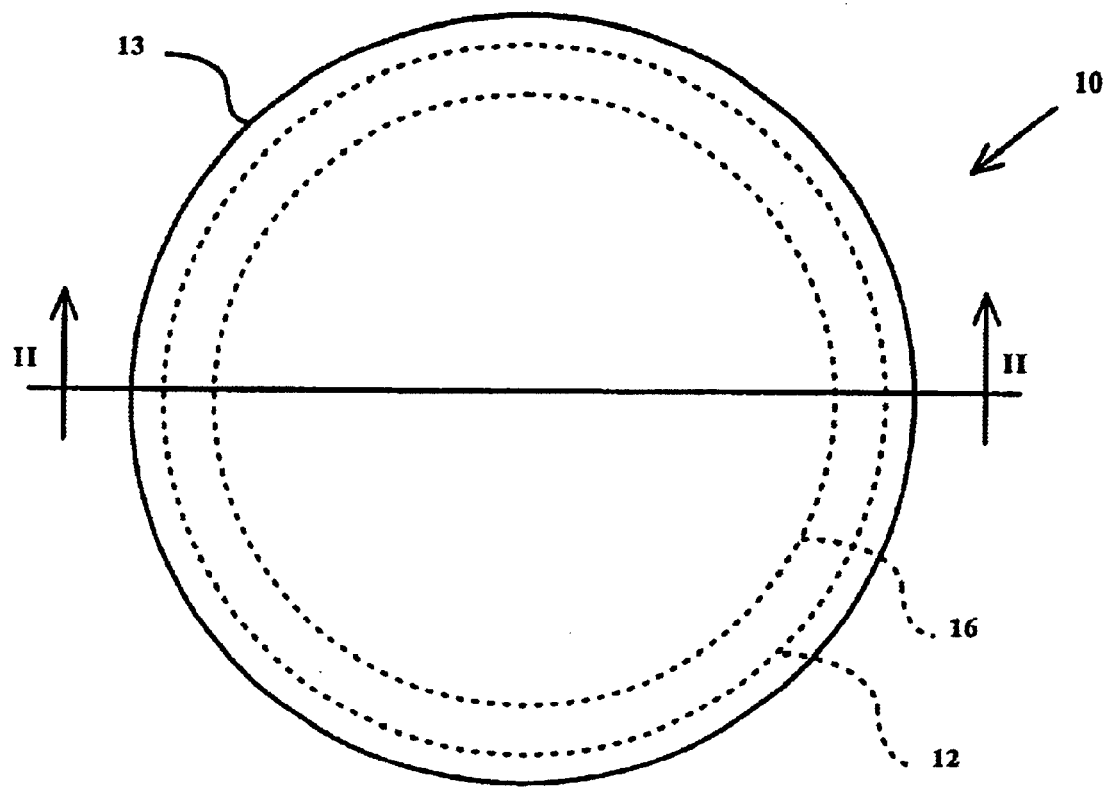
FIG. 1 illustrates a plan view of one form of a utility valve box.
Figure 2:
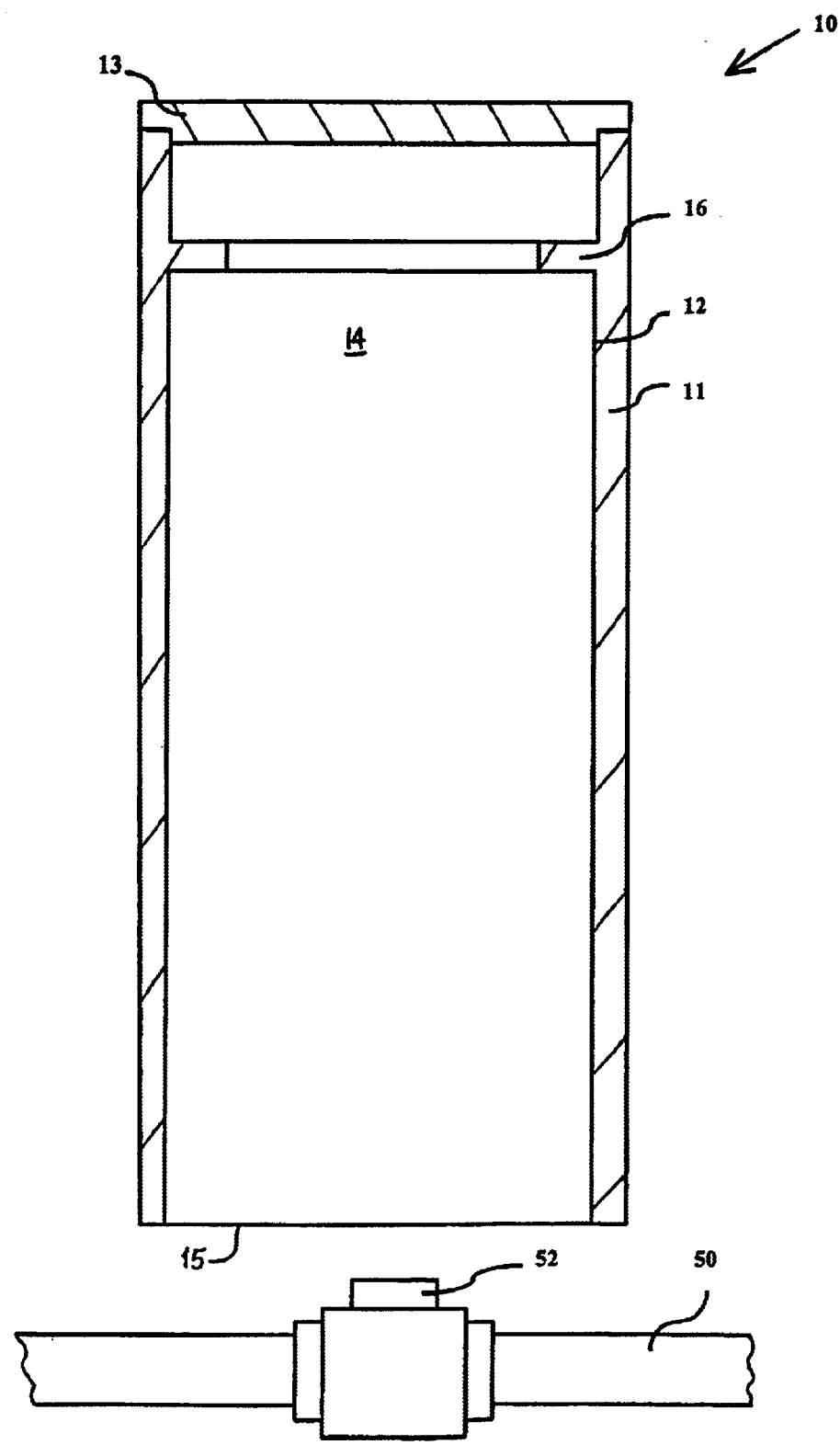
FIG. 2 is a cross-sectional view taken along line II—II of FIG. 1.
Figure 3:
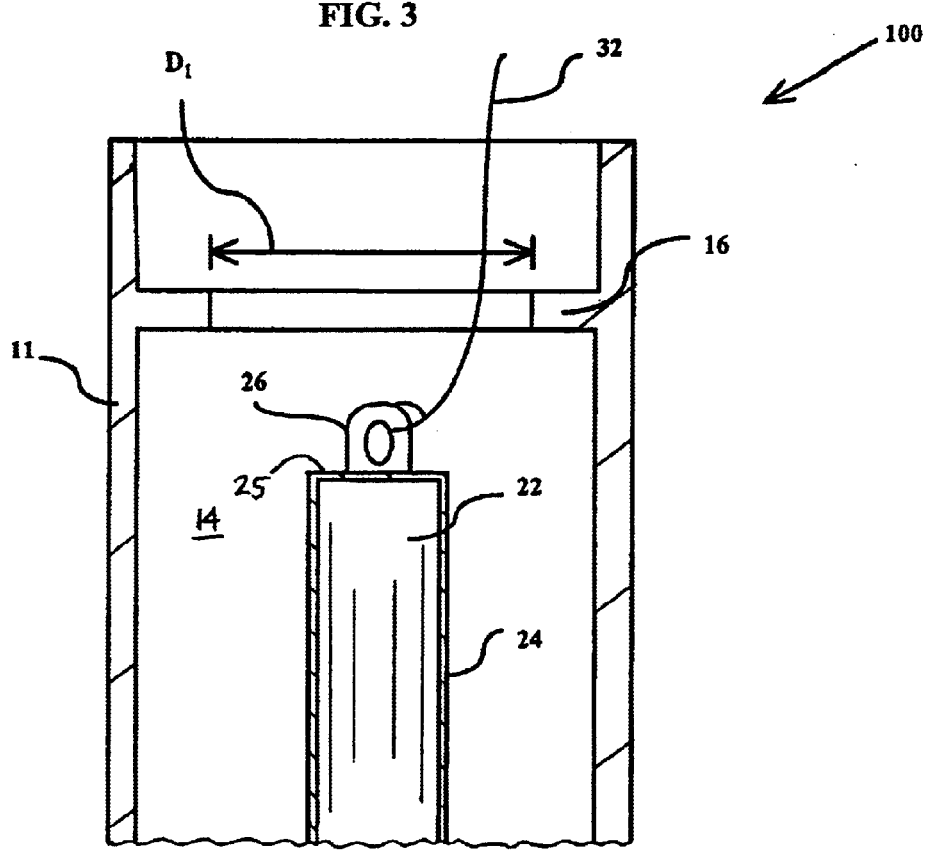
FIG. 3 is a cross-sectional view showing a tube constructed in accordance with an embodiment of the invention.
Figure 4:
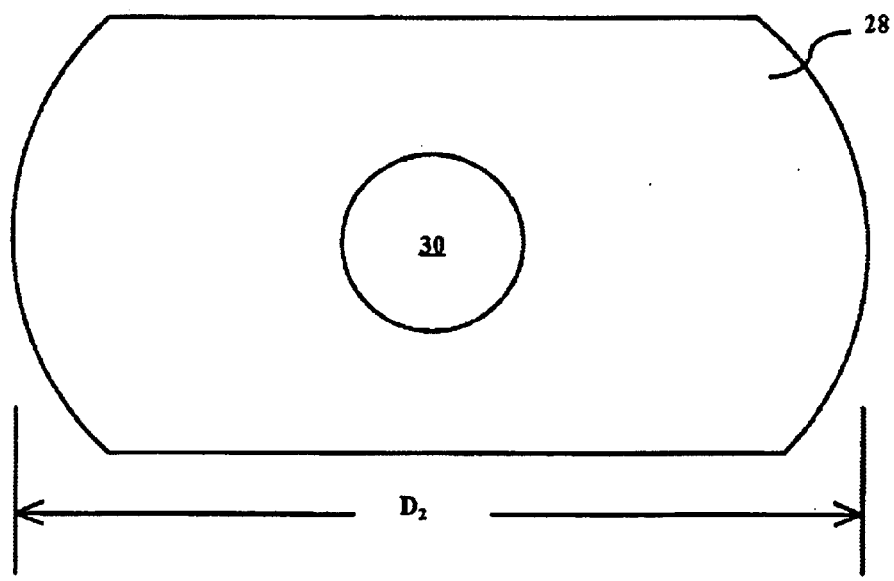
FIG. 4 is an enlarged plan view of a plate constructed in accordance with an embodiment of the invention.
Figure 5:
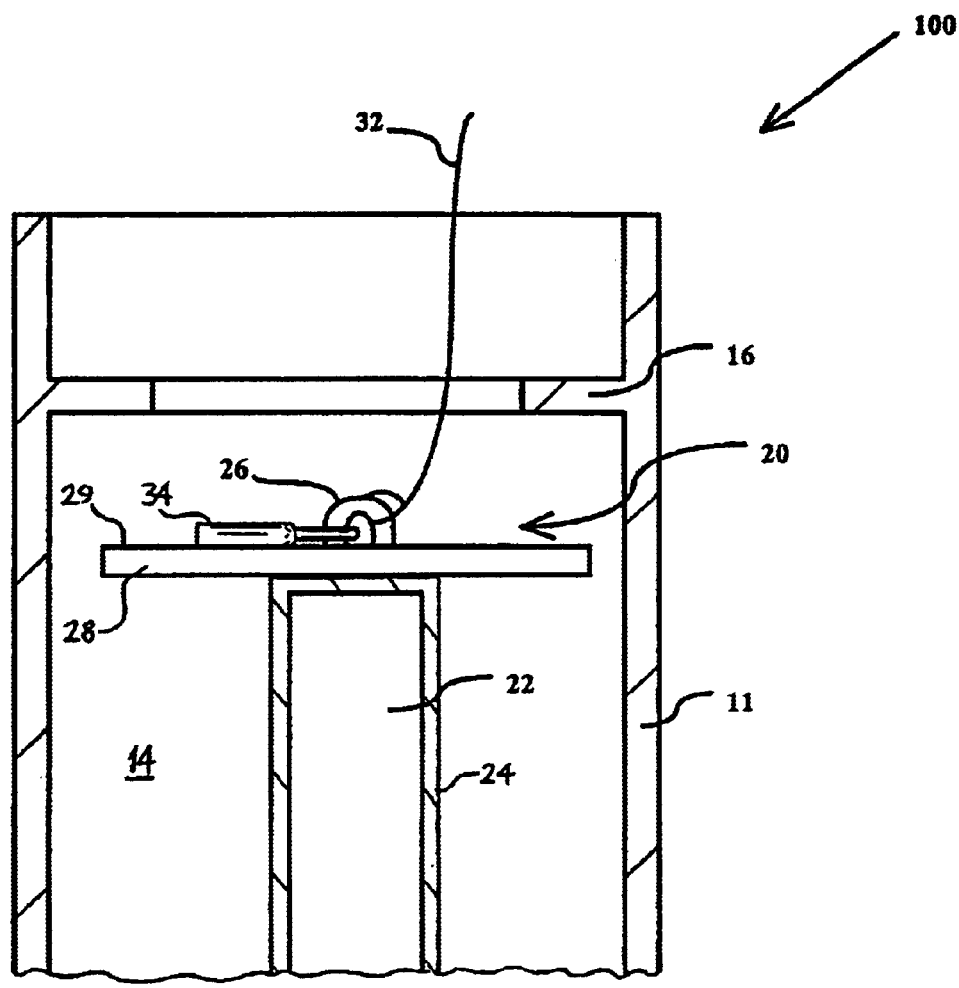
FIG. 5 is a cross-sectional view of a locking device constructed in accordance with an embodiment of the invention.
Figure 5:
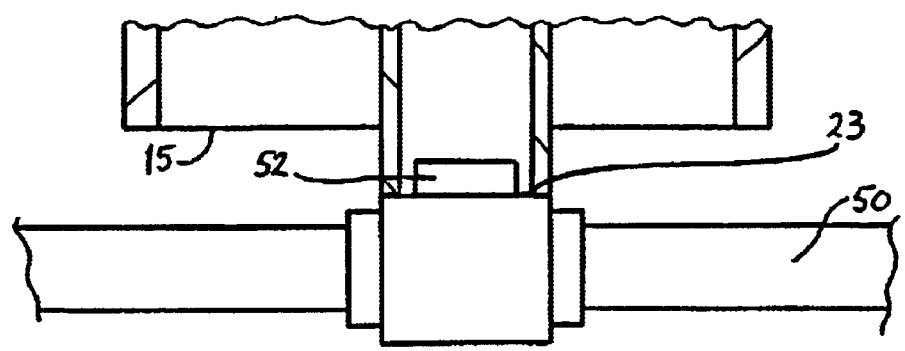

With specific reference to FIGS. 3–5, a utility valve box 100 is illustrated. As with the utility valve box 10, the valve box 100 includes a body member 11 having an interior surface 12, a defined interior space 14, and an inwardly directed lip or ring 16 with an internal diameter $D_1$. The body member 11 is bounded at one end by a covering 13 (FIGS. 1 and 2) and is open at the opposing end 15. The interior space 14 extends down to the opposing end 15, which is adjacent to the valve 52 of a pipeline 50 (FIG. 5).

Access to the interior space 14, and thus the valve 52 of the pipeline 50, is secured with a lockout device 20. The lockout device 20 includes a thin-walled tube 22, a plate 28 and a lock 34. The tube 22 includes a tube body 24 that extends between a first closed end 25 (FIG. 3) and a second open end 23 (FIG. 5). The second open end 23 as illustrated rests upon the pipeline 50. A shackle 26 is attached to the first surface 25 of the tube 22. The shackle 26 may be attached by various suitable ways, such as, for example, through an adhesive, or, if the tube 22 is formed of a metallic material, through welding.

The plate 28 includes a first surface 29 and an opposing surface which rests on the first surface 25 of the tube 22. The plate 28 further includes an opening 30 configured to receive the shackle 26. The plate 28 as illustrated extends a diameter $D_2$ between a pair of arcuate surfaces. The diameter $D_2$ is greater than the diameter $D_1$. Further, the tube 22 is configured to fit snugly within the conduit 12 to prevent one from angling the tube 22 to attempt to remove the lockout device 20 without removing the lock 34.

Next will be described a method for securing access to the valve 52 of the pipeline 50 through the interior space 14 of the body member 11. The tube 22 is positioned within the interior space 14 such that its open end 23 rests upon the pipeline 50 (FIG. 5). A tether 32 is attached to the shackle 26 to aid in removing the tube 22 from the interior space 14 of the body member 11. Preferably, the retaining line 32 is threaded through the opening 30 of the plate 28. The plate 28 is then positioned on the closed end 25 of the tube 22 so that the shackle 26 fits within the opening 30 of the plate 28.

Then, the lock 34 is secured to the shackle 26, thereby retaining the tube 22 with the plate 28 (FIG. 5). The tether 32 can be placed in the interior space 14 of the body member 11 and the covering 13 can then be placed on the valve box 100.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A utility valve box, comprising:
    a body member having an interior surface defining an interior space and a ring projecting from the interior surface radially into the interior space, said ring having an inner diameter; and
    a locking device having a first diameter less than said inside diameter, and a second diameter greater than said inner diameter to suppress removal of said locking device from said body member past said ring.

2. The utility valve box of claim 1, wherein said locking device includes:
    a tube having a tube body extending between opposing first and second ends;
    a shackle attached to said first end of said tube;
    a plate having a first surface and an opening adapted to receive said shackle; and
    a lock adapted to lock said plate to said tube through said shackle.

3. The utility valve box of claim 2, further comprising a tether connected to said shackle.

4. The utility valve box of claim 2, further comprising a valve box covering.

5. The utility valve box of claim 2, wherein said tube comprises a metal.

6. An underground pipeline system, comprising:
    one or more underground pipelines, at least one of which having at least one valve; and
    a utility valve box configured to allow access from the surface to the at least one valve, said utility valve box comprising:
        a body member having a ring extending radially from an internal surface of the body member into an interior space defined by the internal surface, wherein said ring has an inner diameter; and
        a locking device having an outer diameter greater than said inner diameter to prevent removal of said locking device from said interior space past said ring to suppress access to the at least one valve.

7. The underground pipeline system of claim 6, wherein said locking device includes:
    a tube having a tube body extending between opposing first and second ends;
    a shackle attached to said first end of said tube;
    a plate having a first surface and an opening adapted to receive said shackle; and
    a lock adapted to lock said plate to said tube through said shackle.

8. The underground pipeline system of claim 7, further comprising a tether connected to said shackle.

9. The underground pipeline system of claim 7, further comprising a valve box covering.

10. The underground pipeline system of claim 7, wherein said tube comprises a metal.

11. The underground pipeline system of claim 7, wherein said second end of the tube rests upon said one or more pipelines.

12. A method for securing access to an underground valve by way of a utility valve box having an interior space into which an inwardly directed ring having a first diameter extends, said method comprising the steps of:
    providing a locking device comprising a tube with a shackle, a plate with an opening, and a lock;
    installing the tube within the interior space;
    positioning the plate on a first end of the tube with the shackle extending through an opening in the plate; and
    locking the tube to the plate with the lock;
    wherein the plate has a second diameter which is no less than the first diameter of the ring.

13. The method of claim 12, further comprising attaching the shackle to the tube.

14. The method of claim 13, wherein said attaching comprises the use of an adhesive.

15. The method of claim 13, wherein said attaching comprises welding.

16. A utility valve box locking device comprising:
    an elongate body having a first end and a second end;
    a plate supportable across the first end of the elongate body; and
    a locking arrangement adapted to secure the plate supported across the first end of the elongate body.

17. The utility valve box locking device of claim 16, wherein the plate has a length greater than a width, and the elongate body and the plate are arranged to allow insertion past a ring restricting an opening to a utility valve box, and to secure the plate with the locking arrangement to the elongate tube in a position preventing removal of the plate past the ring restricting the opening to the utility valve box.

* * * * *